Dec. 23, 1969
A. PRYSHLAK
3,484,944
ALIGNING OF GUIDE V-RAILS
Filed Jan. 29, 1968
2 Sheets-Sheet 1
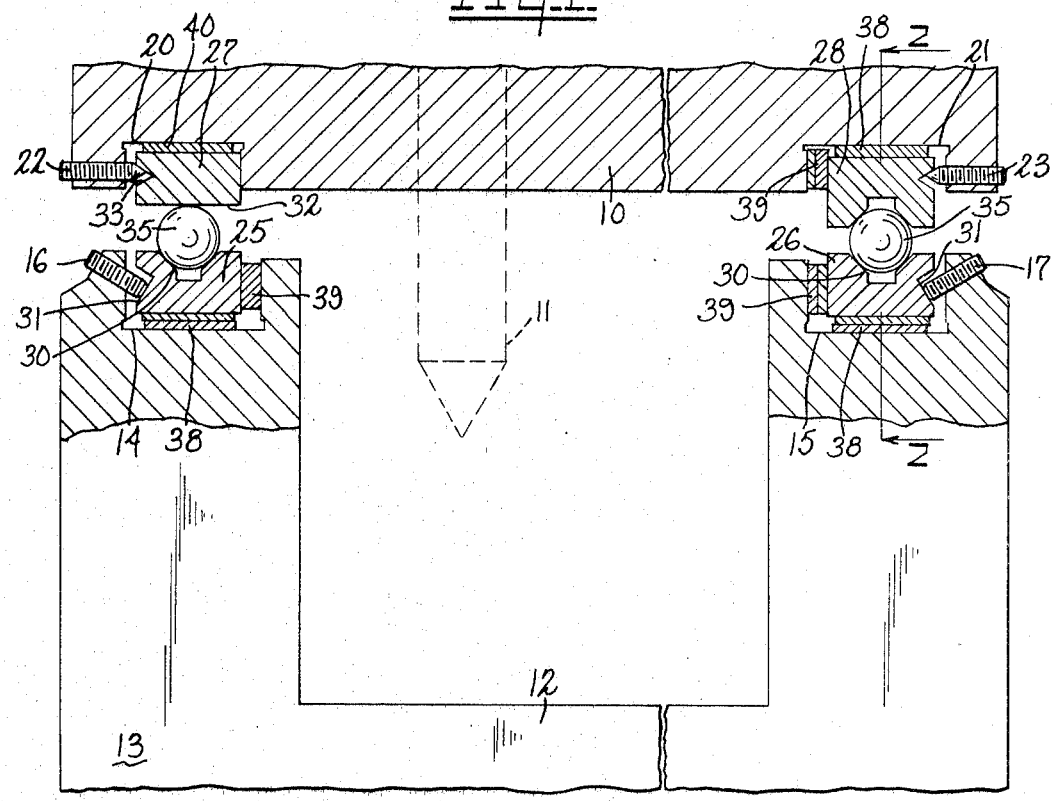
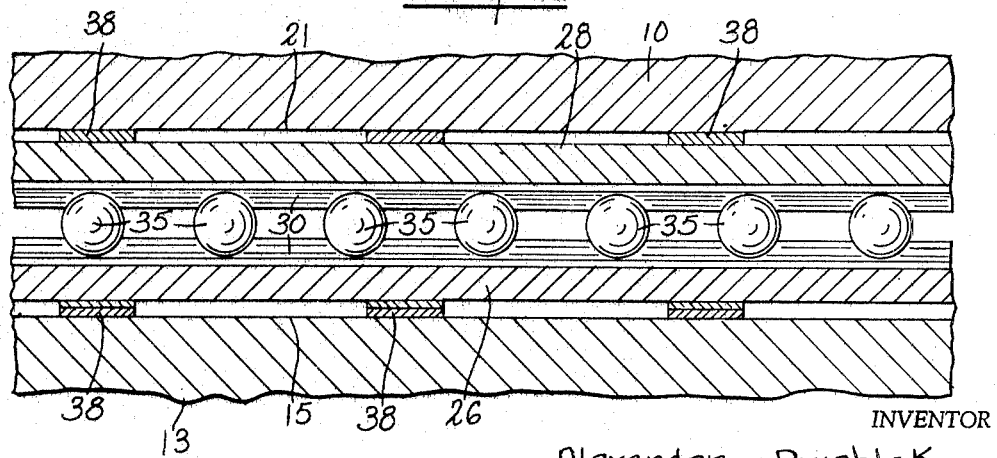
INVENTOR
Alexander Pryshlak
BY De Lio and Montgomery
ATTORNEYS

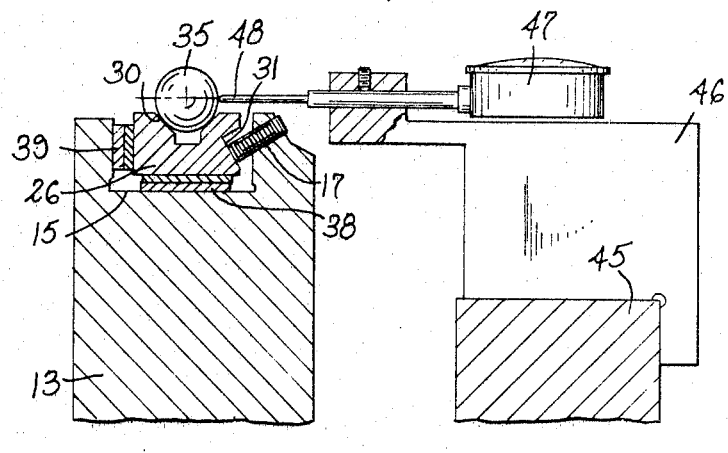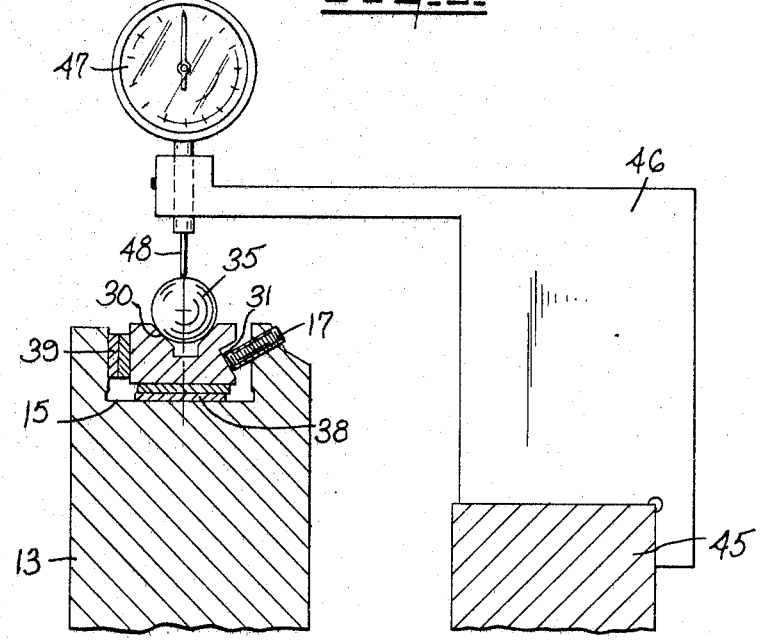

United States Patent Office 3,484,944
Patented Dec. 23, 1969

3,484,944
ALIGNING OF GUIDE V-RAILS
Alexander Pryshlak, Hartford, Conn., assignor to Pratt & Whitney Inc., West Hartford, Conn., a corporation of Delaware
Filed Jan. 29, 1968, Ser. No. 701,263
Int. Cl. G01b 5/24, 3/38, 3/30
U.S. Cl. 33—181                                    2 Claims

ABSTRACT OF THE DISCLOSURE

This invention relates to a method of aligning V-ball slide assemblies on a mounting surface. The method of the invention comprises the steps of supporting a V-rail on gage or hoke blocks positioned on the mounting surface. Thereafter, a theoretical straight line is established with respect to a reference surface and the initial blocks are then replaced to correct for any misalignment.

---

This invention relates to a method for accurately aligning V-ball slide assemblies. This invention finds utility particularly for use in aligning V-ball slide assemblies of coordinate measuring machines and positioning devices. An example of a coordinate measuring machine is shown in U.S. Patent 3,286,353.

In the past, such assemblies have been aligned by fitting the assembly into its supports and lapping and scraping the supports to insure straightness. Although such techniques are quite acceptable, they increase considerably the cost of any machine constructed in this manner. On the other hand, by using the method of this invention rather than the time-consuming method of the prior art, actual cost savings in the hundreds of dollars have been realized in the construction of coordinate measuring machines.

The present invention is not only less costly, but is also less time-consuming and requires less skilled labor in effecting alignment of the assembly.

Accordingly, it is an object of this invention to provide a new and improved method for aligning V-ball slide assemblies.

Another object of this invention is to provide a new, improved and less expensive method for constructing V-ball slide assemblies.

Still other objects and advantages of the invention will in part be obvious and will in part be apparent from the specification.

The invention accordingly comprises the several steps and the relation of one or more of such steps with respect to each of the others thereof which will be be exemplified in the method hereinafter disclosed and the scope of the invention will be indicated in the claims.

For a fuller understanding of the nature and objects of the invention, reference is had to the following description, taken in connection with the accompanying drawings, in which:

FIG. 1 is a front sectional view of a machine having a V-ball assembly;

FIG. 2 is a sectional view taken along line 2—2 of FIG. 1;

FIG. 3 is a view of a fixture for practicing the method of this invention; and

FIG. 4 is a view of another fixture for practicing the method of this invention.

Referring to FIGS. 1 and 2, there is shown a portion of a coordinate measuring machine having a carriage 10 for supporting a probe generally shown at 11. The probe 11 may be lowered or raised, in accordance with known procedures in this art, to measure the distance between two points on a workpiece. The workpiece is supported by a table portion shown at 12 of the machine base 13. Formed within the base member 13 are rail mounting surfaces shown at 14 and 15. Screws 16 and 17, respectively, are threaded through a portion of the base member 13. The carriage 10 is also provided wtih rail mounting surfaces 20 and 21 and screws 22 and 23, respectively, are provided for positioning the rails. Two lower rails for guiding the carriage are shown at 25 and 26 and two upper rails are shown at 27 and 28. The rails 25, 26 and 28 are constructed with V-shaped bearing portions 30 and V-notched portions 31. The rail 27 is constructed with a flat bearing surface shown at 32 and a V-notch shown at 33, since only one V-notched pair, back-to-back, is required to position the carriage with respect to the base member.

Positioned between the rails 25, 27 and 26, 28 are precision rolls or balls, shown at 35. To position the rails 25–28 in both the horizontal and vertical directions, gage blocks 38 and 39 are provided to accurately position the rails 25, 26 and 28, and a gage block 40 is used to position the rail 27 since rail 27 need only be positioned vertically.

In order to practice the method of this invention, so as to align the rails 25–28 in the horizontal and vertical directions, two fixtures are provided, shown in FIGS. 3 and 4, respectively. These fixtures comprise standard reference surface member 45 and a member 46 supported thereon such that it may slide thereover. The member 46 supports a gage device 47 having a probe 48 which may engage the surface of the precision rolls to determine the straightness of the rails with respect to the reference 45.

FIGURE 4 shows the same type of gaging device, except that instead of measuring vertically the precision rolls, the roll is measured such that the rails may be accurately positioned in the horizontal direction. A suitable gaging device for accomplishing the measuring to determine the straightness of the rails, may be a device made and sold by Pratt & Whitney Inc. of West Hartford, Conn., and known as the "Opt-o-Limit" (trademark) electronic indicator.

In order to practice the method of this invention, the following steps are taken. Initially, the V-rails and the mounting surfaces therefor are manufactured within reasonable tolerances. Thereafter, the V-rails, such as the bottom rail 25, are positioned in place with a plurality of basic gage block sizes positioned under and to one side of the V-rail 25 and between the rail 25 and the base 13. Thereafter, the screw 16 is forced against one wall 31 of a V-notch formed within V-rail 25. The V-rail is clamped at an angle, as shown in the accompanying drawings (FIG. 3). Thereafter, a precision roll (or more than one precision roll) is placed as shown at 35 on the V-bearing surfaces 30. Using the apparatus of FIG. 3, a theoretical straight line is then first established in the vertical direction and, subsequently, using the apparatus of FIG. 4, a theoretical straight line is established in the horizontal direction. By establishing the theoretical straight line, there can then be determined the size of the gage blocks which must be inserted to straighten and align the rail with respect to the theoretical straight line developed by using the measuring devices.

At this time the initial blocks used are replaced with the correct dimension blocks along the length of the V-rail 25. After the new gage blocks are replaced, once again the measuring devices of FIGS. 3 and 4 can be utilized to make any further corrections, if necessary. The theoretical straight line is developed by the apparatus of FIG. 3 with respect to the reference member 45, by engaging the precision roll 35 in the vertical direction. The same approach is taken with the apparatus of FIG.

4, by engaging the precision roll in the horizontal direction. In this manner, it is possible to effect alignment of the V-rail assembly without the costly lapping and scraping techniques of the prior art. The use of the present invention permits a V-rail assembly to be positioned in place at considerable cost saving and with a considerable saving in time.

It will thus be seen that the objects set forth above, among those made apparent from the preceding description, are efficiently attained and since certain changes may be made in carrying out the above method and in the constructions set forth without departing from the spirit and scope of the invention, it is intended that all matter contained in the above description and shown in the accompanying drawings shall be interpreted as illustrative, and not in a limiting sense.

What is claimed is:

1. A method for aligning V-rails, having V-shaped bearing surfaces for the positioning of precision rolls and a V-shaped notch formed therein, with respect to a mounting surface of a body having a portion formed therein for receiving the rail and a screw means supported therefrom to engage one wall of the V-shaped notch, said method comprising the steps of
   (a) placing a V-rail on the mounting surface,
   (b) placing basic size gage blocks along the length of the rail between the rail and the mounting surface,
   (c) clamping the rail by the use of the screw means against a wall of the V-shaped notch to force the rail against the gage blocks,
   (d) placing at least one of the precision rolls on the V-shaped bearing surface,
   (e) measuring from a known reference surface to the surface of the precision roll placed in the V-shaped bearing surface to establish a theoretical straight line for the rail, and
   (f) replacing the initial blocks with blocks to position the rail with respect to the mounting surface in the theoretical straight line established.

2. A method according to claim 1, in which the roll is positioned in a straight line in both the vertical and horizontal directions.

References Cited

UNITED STATES PATENTS

| | | |
|---|---|---|
| 2,761,217 | 9/1956 | King. |
| 3,186,094 | 6/1965 | Hayes et al. |
| 3,377,711 | 4/1968 | Wempe. |

WILLIAM D. MARTIN, Jr., Primary Examiner

U.S. Cl. X.R.

33—1, 172, 174; 308—6